(12) United States Patent
Martinez et al.

(10) Patent No.: US 7,165,290 B2
(45) Date of Patent: Jan. 23, 2007

(54) CASTER AND DOLLY WHEEL ATTACHMENTS FOR CYLINDRICAL TANKS

(75) Inventors: David Martinez, Williamsport, PA (US); Robert Lent Crevling, Jr., Williamsport, PA (US)

(73) Assignee: Shop-Vac Corporation, Williamsport, PA (US)

( * ) Notice: Subject to any disclaimer, the term of this patent is extended or adjusted under 35 U.S.C. 154(b) by 0 days.

(21) Appl. No.: 10/677,782

(22) Filed: Oct. 2, 2003

(65) Prior Publication Data
US 2005/0071949 A1   Apr. 7, 2005

(51) Int. Cl.
  *B60B 33/00* (2006.01)
(52) U.S. Cl. .......................... 16/30; 16/29; 16/18 CG; 280/47.32; 15/339; 15/327.6
(58) Field of Classification Search .................... 16/30, 16/29, 31 R, 18 CG, 18 B; 220/528, 628, 220/630; 15/339, 327.6; 280/47.32, 79.5, 280/47.31, 47.3; 248/300, 220.1
See application file for complete search history.

(56) References Cited

U.S. PATENT DOCUMENTS

| 2,049,344 | A | * | 7/1936 | Wittke, Jr. ...................... 16/30 |
| 2,437,588 | A | * | 3/1948 | Baum ............................. 16/20 |
| 2,483,241 | A | * | 9/1949 | Shepherd ................. 16/18 CG |
| 2,543,697 | A | * | 2/1951 | Lanter ........................ 280/79.2 |
| 2,567,185 | A | * | 9/1951 | Coviello ......................... 16/30 |
| 3,310,318 | A |   | 3/1967 | Nagel |
| 3,463,505 | A |   | 8/1969 | German et al. |
| 3,732,667 | A | * | 5/1973 | Fromknecht et al. ......... 55/373 |
| 3,734,527 | A | * | 5/1973 | Bard .......................... 280/79.5 |
| 4,086,680 | A | * | 5/1978 | Kelly ............................. 16/30 |
| 4,509,227 | A | * | 4/1985 | Keane ........................... 16/23 |
| 4,827,564 | A | * | 5/1989 | Brown ....................... 16/18 R |
| 5,086,538 | A | * | 2/1992 | Zahuranec ................... 15/354 |
| 5,244,218 | A |   | 9/1993 | Irwin, Sr. |
| 5,373,606 | A | * | 12/1994 | Bosyj et al. .................. 15/323 |
| 5,606,769 | A | * | 3/1997 | Tomasiak et al. .......... 15/327.6 |
| 5,924,165 | A | * | 7/1999 | Gierer et al. ................. 15/323 |
| 6,543,085 | B1 | * | 4/2003 | Holsten et al. ............... 15/410 |
| 6,588,059 | B1 | * | 7/2003 | McCord ........................ 16/30 |
| D512,545 | S | * | 12/2005 | Griffin ........................ D32/21 |

FOREIGN PATENT DOCUMENTS

EP   0 209 455 A1   1/1987
EP   0 289 937 A2   11/1988

OTHER PUBLICATIONS

European Search Report date Feb. 15, 2006 in corresponding EP application No. 04291857.3.

* cited by examiner

*Primary Examiner*—Brian E. Glessner
*Assistant Examiner*—Mark Williams
(74) *Attorney, Agent, or Firm*—Marshall, Gerstein & Borun LLP

(57) ABSTRACT

Caster wheel assemblies that may be snap-fitted onto a cylindrical tank or drum are shown and described. Also dolly-wheel assemblies that include an axle supported by two wheels are also disclosed which may be snap-fitted onto a cylindrical tank or drum. The caster wheel assemblies and dolly wheel assemblies disclosed herein may be easily mounted onto a tank or drum without the need for a separate supporting platform. A flexible nature of the caster wheel assemblies and wheel-dolly assemblies enables them to be snap-fitted onto tanks of varying diameters.

31 Claims, 8 Drawing Sheets

CASTER AND DOLLY WHEEL ATTACHMENTS FOR CYLINDRICAL TANKS

TECHNICAL FIELD

Caster sub-assemblies and wheel dolly-type subassemblies are shown and described for attachment to cylindrical tanks. The caster and dolly wheel assemblies may be detachably mounted to the bottom of a cylindrical tank with a snap-fit connection.

BACKGROUND OF THE RELATED ART

Tank-type vacuum cleaners are known. These types of vacuum cleaners conventionally include a cylindrical tank supported on a platform which, in turn, is connected to a plurality of caster wheels, typically three or four caster wheels. The tank is typically secured to the caster wheel platform by some sort of clamping mechanism.

One problem associated with this conventional design is the bulkiness of the caster wheel platform. Specifically, the caster wheels are typically provided to the consumer already connected to the platform and the combination of the caster wheels and platform require a large package which cannot be disposed inside the interior of the tank because the combination of the platform and caster wheels is wider than the diameter of the tank. Thus, the conventional design necessarily involves large packaging and shipping costs.

Another problem associated with the conventional design is the tendency of the tank to become dislodged from the caster wheel platform. Often, the clamping mechanisms wear out or not be secured strongly enough to the tank which can result in dislodgement of the tank from the platform during use, to the frustration of the consumer. The top portion of the tank housing the vacuum motor and hose connection may also become dislodged as the tank falls to the ground, thereby spilling the content of the tank onto the floor or work surface.

For vacuums designed to clean up spilled water or other liquids the tank becomes filled with dense liquid making the entire vacuum heavier as the tank fills up with liquid material. Often, the entire vacuum can tip over if a tank filled with liquid is pushed along a surface that is not completely smooth or level such as a carpeted surface, a workshop floor that may be littered with debris or other materials or an inclined ramp. Often, the user will apply force to the top of the tank thereby increasing the susceptibility of the vacuum to tipping over.

To alleviate this deficiency, it would advantageous to have a dolly-type wheel assembly in addition to one or more caster assemblies. However, to provide this solution, a separate platform must be manufactured which provides the dolly wheel assembly and one or more caster assemblies.

All of the above deficiencies could be remedied if there was a convenient way to attach a wheel assembly to a cylindrical tank without the need for a platform connecting the wheel assemblies together. However, bolting wheel assemblies directly to the tank is not preferred if a bolt or other fastener must be passed through the wall of the tank, thereby violating the integrity of the tank wall. Further, this inferior solution would preclude the consumer from modifying the wheel arrangement after purchase.

Therefore, an improved means for attaching caster wheel assemblies and dolly-type wheel assemblies to cylindrical tanks is needed which is versatile and which eliminates the need for the wheel assemblies to be pre-attached to either a platform or the tank prior to shipment and handling.

SUMMARY OF THE DISCLOSURE

In satisfaction of the aforenoted needs, a combination caster assembly and tank are disclosed wherein the caster assembly snap fits onto the tank. The combination comprises a caster assembly comprising a housing comprising an outer shell connected to at least one caster wheel. The outer shell is also connected to an outer wall. The outer wall extends downward from the outer shell before terminating at a u-shaped lower edge that is connected to and disposed between the outer wall and an upwardly extending inner wall. The outer wall is connected to an inwardly extending ledge disposed above the u-shaped lower edge and which extends towards the inner wall. The outer wall, u-shaped lower edge, inner wall and ledge of the caster housing define a female receiving area. The combination also includes a tank that comprises an outer wall that extends downwardly and terminates at a radially outwardly extending lower bead. The lower bead is disposed between and connected to the outer wall of the tank and an upwardly extending inner wall of the tank. The bead of the tank snap-fits into the female receiving area of the caster housing.

In a refinement, the inner wall of the caster housing terminates at a radially inwardly extending lip and the inner wall of the tank terminates at a radially inwardly bottom panel. The bottom panel of the tank is disposed on top of the lip of the caster housing when the bead of the tank is snap fitted into the female receiving area of the caster housing.

In another refinement, the caster housing is fabricated from molded plastic.

In yet another refinement, the bead of the tank is hollow.

In another refinement, the tank is fabricated from sheet metal.

In yet another refinement, the outer wall of the caster housing forms part of a threaded aperture disposed opposite the outer wall of the caster housing from the female receiving area. The u-shaped lower edge of the caster housing comprises an opening aligned with the threaded aperture. The caster assembly further comprises a fastener received in the threaded aperture. The fastener comprises a flange received in the opening of the u-shaped lower edge and which engages a lower surface of the bead of the tank when the fastener is tightened within the threaded aperture.

In a refinement, the tank is fabricated from sheet metal and the bead is hollow and rectangular in shape.

In another refinement, the tank is cylindrical and the outer wall of the tank is convex and the outer wall of the caster housing is concave.

In another refinement, the tank is connected to at least three caster assemblies.

In another refinement, the tank is also connected a wheel dolly assembly that comprises a wheel dolly assembly comprising a housing comprising an outer shell connected to an axel disposed between and connected to a pair of wheel. The outer shell of the wheel dolly housing is being connected to a first outer wall. The first outer wall of the wheel dolly housing extends downward from the outer shell of the wheel dolly housing before terminating at a first u-shaped lower edge that is connected to and disposed between the first outer wall of the wheel dolly housing and a first upwardly extending inner wall. The first outer wall of the wheel dolly housing is connected to a first inwardly extending ledge disposed above the first u-shaped lower edge of the wheel dolly housing and which extends towards the first inner wall of the wheel dolly housing. The first outer wall, the first u-shaped lower edge, the first inner wall and the first ledge of the wheel dolly housing defines a first female receiving area of the wheel dolly housing. The bead of the tank snap fits into the first female receiving area of the wheel dolly housing.

In a refinement, the outer shell of the wheel dolly housing further comprises a second outer wall, second u-shaped lower edge, second inner wall and second ledge configured like said first outer wall, first u-shaped lower edge, first inner wall and first ledge but spaced apart there from to define a second female receiving area for receiving the bead of the tank that is spaced apart from the first female receiving area.

An improved caster assembly for snap-fitting onto a tank, such as a cylindrical tank, is also disclosed with the structure analogous to that described above. It will be noted that the disclosed caster assembly can be used with a tank for a vacuum cleaner, that other applications will be apparent to those skilled in the art. In short, the improved caster assembly disclosed herein can be easily and securely connected to any cylindrical tank which required mobility. The disclosed caster assembly, for example, could be used as caster assemblies for cylindrical steel garbage cans or cylindrical drums that need to be movable upon a floor or work surface. In terms of the application the vacuum cleaners, if only caster assemblies are utilized, the preferred embodiment utilizes at least three caster assemblies, and preferably four caster assemblies. It is anticipated that more than four caster assemblies might be required for certain vacuum cleaner designs.

When the caster assemblies are combined with the wheel dolly assembly described above, a preferred combination is one wheel dolly assembly and at least one caster assembly, preferably two caster assemblies.

Further, in preferred embodiments, housing of the wheel dolly assembly and housing of the caster assembly are each fabricated from plastic, preferably by way of an injection molded process. Thus, each housing is flexible. Accordingly, one caster housing design and one wheel dolly housing design can be used to fit cylindrical tanks of different sizes. In a preferred embodiment, the caster housings and wheel dolly housings are capable of fitting cylindrical tanks having diameters ranging from about 14 inches to about 16 inches. Thus, the caster housings and wheel dolly housings are capable of fitting onto tanks of at least two, and perhaps three different sizes (e.g., 14 inch, 15 inch or 16 inch).

Also, in an embodiment, the manufacture may mark the lower bead of the tank or the bottom panel of the tank to provide an indication to the user as to where to attach the one or more caster assemblies and/or wheel dolly assemblies. By marking the bottom of the tank or the bead of the tank, the manufacturer removes any guesswork on the part of the consumer as to the appropriate spacing for the wheel assemblies on the bottom of the tank.

In an alternative refinement, instead of marking the tank, either the bottom panel of the tank or the lower bead of the tank, the manufacture may supply a removable template, in the form of a piece of paper or other inexpensive material that can be placed along the bottom panel of the tank with indicia or markings thereon that provides the consumer with an easily recognizable guide for attaching the caster assemblies and/or wheel dolly assemblies. Specifically, with the tank in an inverted position, the consumer places the template on the bottom panel and the template includes indicia for lining up the caster assemblies and wheel dolly assemblies. The template may also include a separate marking to line the template up with the vacuum hose outlet or other fixed structure on the tank.

BRIEF DESCRIPTION OF THE DRAWINGS

The disclosed embodiments are described more or less diagrammatically in the accompanying drawings, wherein.

The drawings are not necessarily to scale in the embodiments have sometimes been illustrated by phantom lines and fragmentary views. In certain instances, details which are not necessary for an understanding of the disclosed embodiments or which render other details difficult to perceive may have been omitted. It should be understood, of course, that this disclosure is not necessarily limited to the particular embodiments illustrated herein.

DETAILED DESCRIPTION OF THE PRESENTLY PREFERRED EMBODIMENTS

Figure 1:
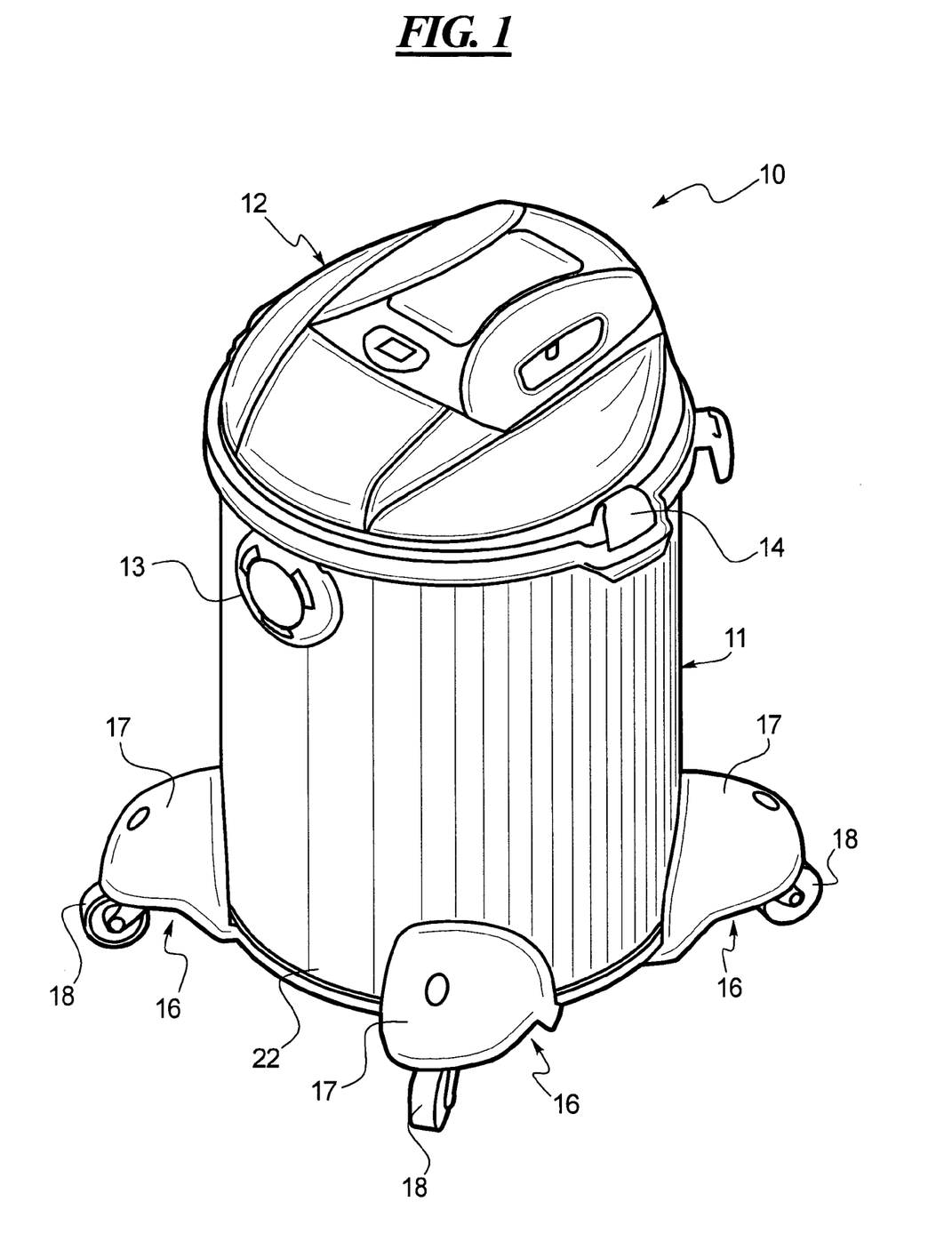
FIG. 1 is perspective of a vacuum cleaner that comprises a cylindrical tank connected to four caster assemblies made in accordance with this disclosure.

Turning to FIG. 1, a vacuum cleaner 10 is disclosed which includes a cylindrical tank 11 having an open top (not shown) connected to a lid 12. The lid 12 will typically include the vacuum motor (not shown) and various controls. The tank 11 includes a suction port 13 for connection to a suction hose (not shown). The lid 12 is connected to the tank 11 by way of one or more clips, one of which is shown at 14 that extends through a slot (not shown) in the outer periphery of the lid 12 and snaps into place as shown.

Figures 6A, 6B, 6C:
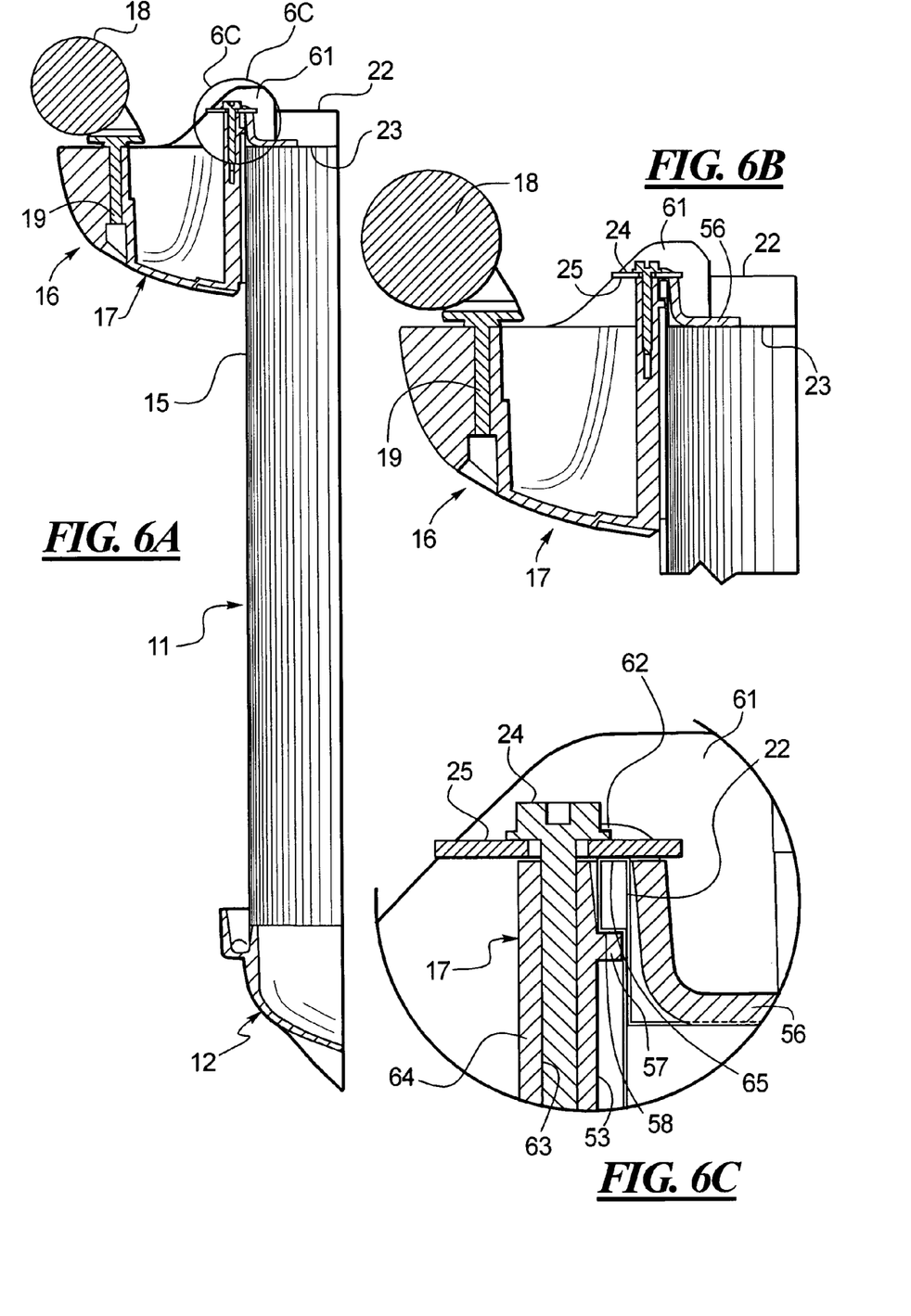
FIG. 6A is a sectional view taken substantially along line 6—6 of FIG. 4.
FIG. 6B is an enlarged partial sectional view taken substantially along line 6—6 of FIG. 4.
FIG. 6C is an enlarged detailed view of the are labeled 6C of FIG. 6A.

The bottom or lower portion 15 of the tank 11 is connected to a plurality of caster wheel assemblies shown at 16. Each caster wheel assembly 16 includes an outer housing 17 which is connected to one or more caster wheels 18. In the embodiments illustrated, the caster housings 17 are fabricated from plastic and the caster wheels 18 are connected to rigid shafts 19 as shown in FIGS. 6C and 6B which are snapped into place in the housings 17 in a conventional manner.

As seen in FIG. 1 and explained in greater detail below in reference to FIGS. 4–7C, the lower portion 15 of the tank 11 formed an outer wall 15 which is connected to a lower bead 22. The caster assemblies 16 are snap fitted onto this lower bead 22 and the mechanism for this connection will be described in greater detail with respect to FIGS. 4–7C.

Figure 2:
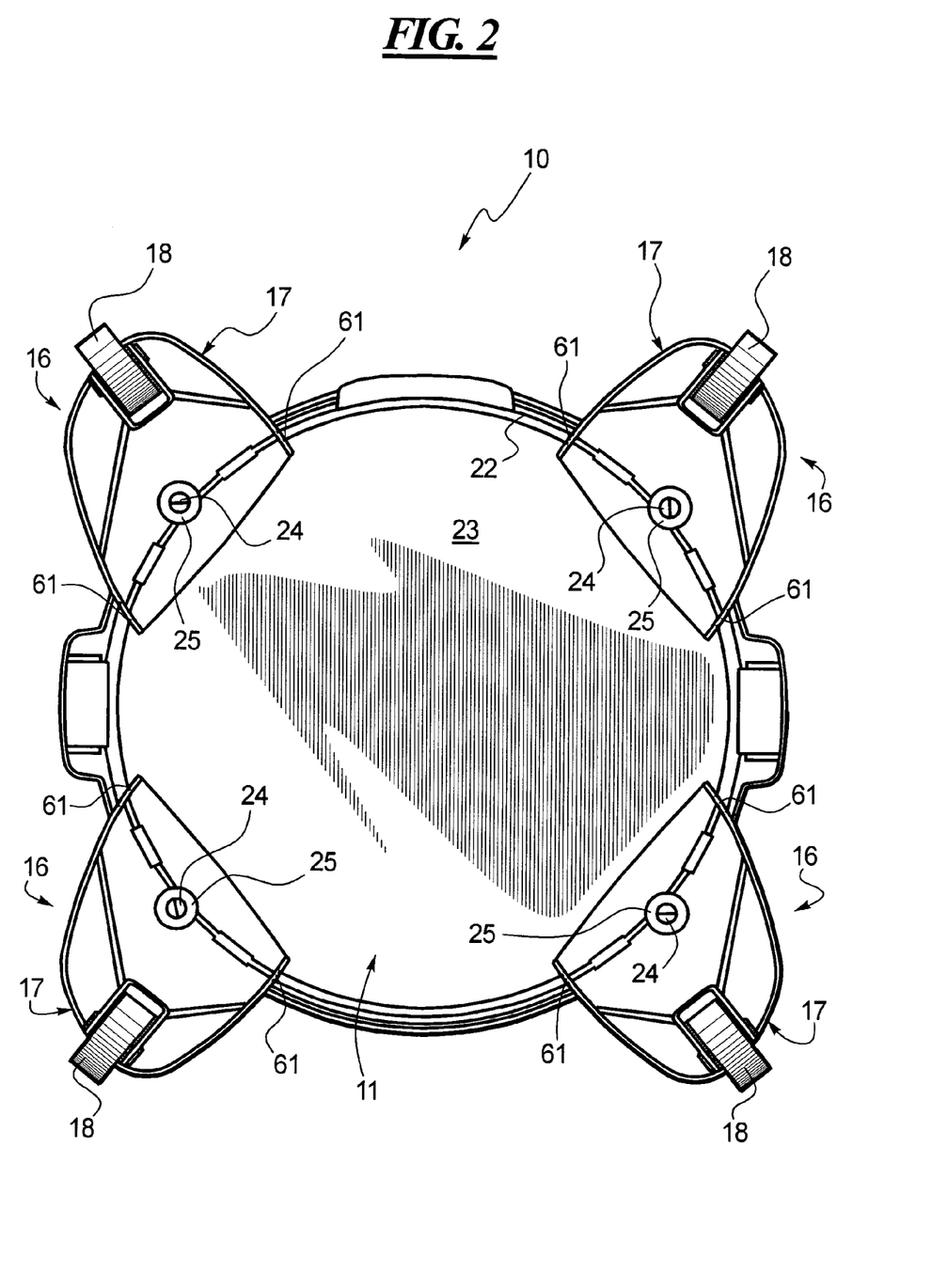
FIG. 2 is a bottom plan view of the vacuum cleaner shown in FIG. 1.

As shown in FIG. 2, the lower bead 22 of the tank 11 connects the wall 15 to the bottom panel 23. The caster assemblies 16 are snapped onto the lower bead 22 in a spaced-apart arrangement as shown in FIG. 2. While the embodiment 10 shown in FIG. 2 discloses the use of four caster assemblies 16, it will also be noted that less than four caster assemblies 16 or more than four caster assemblies 16 could be utilized, depending upon the application. If the tank 11 carries extremely heavy materials such as liquids or heavy solids, more than four caster assemblies 16 may be desirable. If the tank 11 carries only lightweight material, less than four caster assemblies 16 may be preferred. Again, while the embodiment 10 is a vacuum cleaner, it will be noted that the caster assemblies 16 disclosed herein have other applications as well.

To secure the caster assemblies 16 in the orientation shown in FIG. 2 and to prevent any peripheral movement of the caster 16 about the lower bead or lower edge 22 of the tank 11, fasteners 24 are provided with integral or separate washers 25. The use of the fasteners 24 and washers 25 will be discussed below in connection with FIG. 6C.

Figure 3:
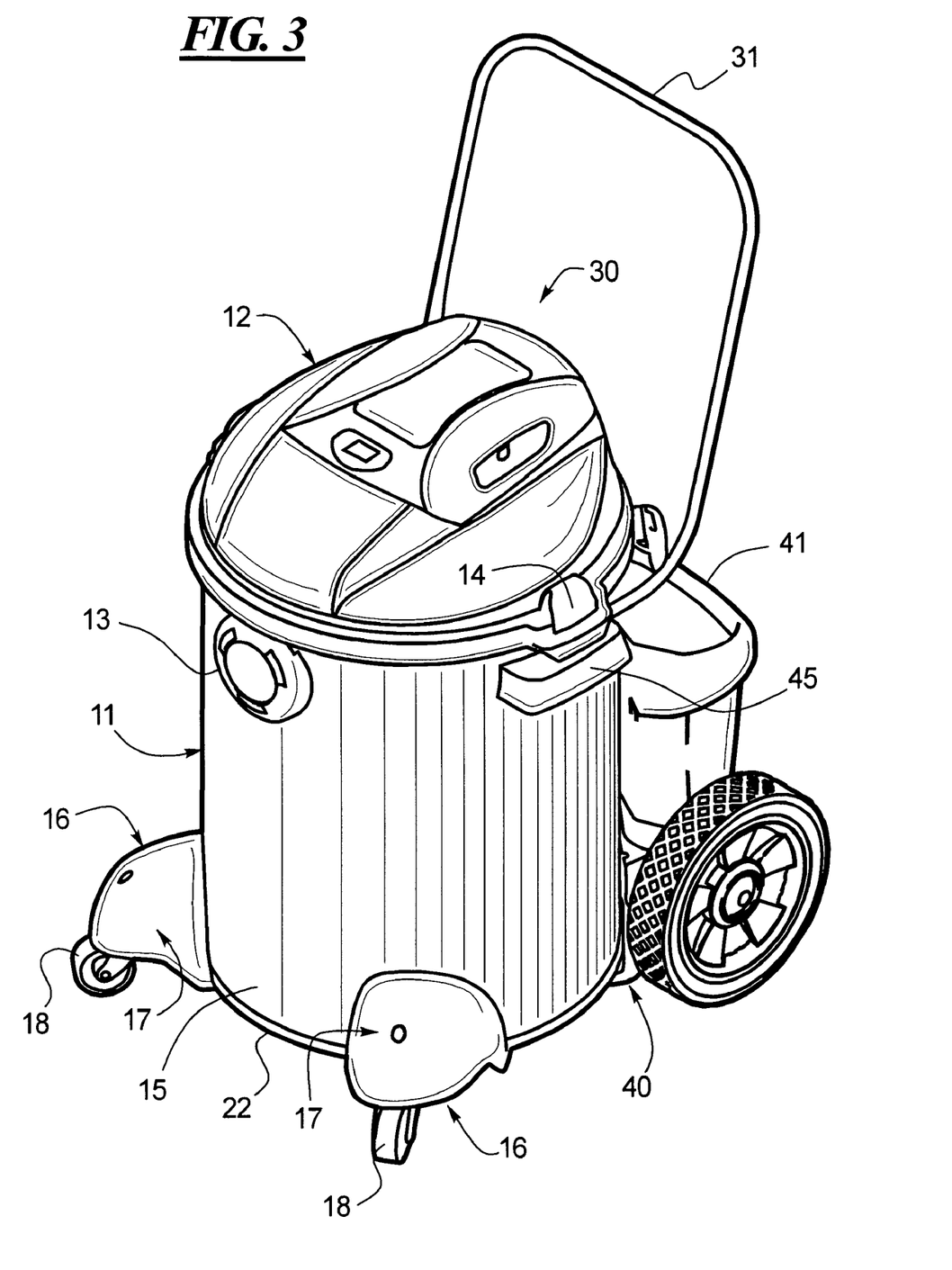
FIG. 3 is a perspective view of another vacuum cleaner including a cylindrical tank connected to two disclosed caster assemblies and one wheel dolly assembly, made in accordance with this disclosure.

An alternative vacuum cleaner 30 is shown in FIG. 3. Like the vacuum cleaner 10 shown in FIGS. 1–2, the vacuum cleaner 30 includes a cylindrical tank 11 connected to a top 12 by one or more clips shown at 14. The tank 11 also includes a suction hose port 13. Also, the tank 11 of the vacuum cleaner 30 is connected to two caster wheel assemblies shown at 16. In addition, the vacuum cleaner 30 includes a handle 31 and a wheel dolly assembly 40 which will be described in greater detail in FIG. 4. A basket 41 is also included.

Figure 4:
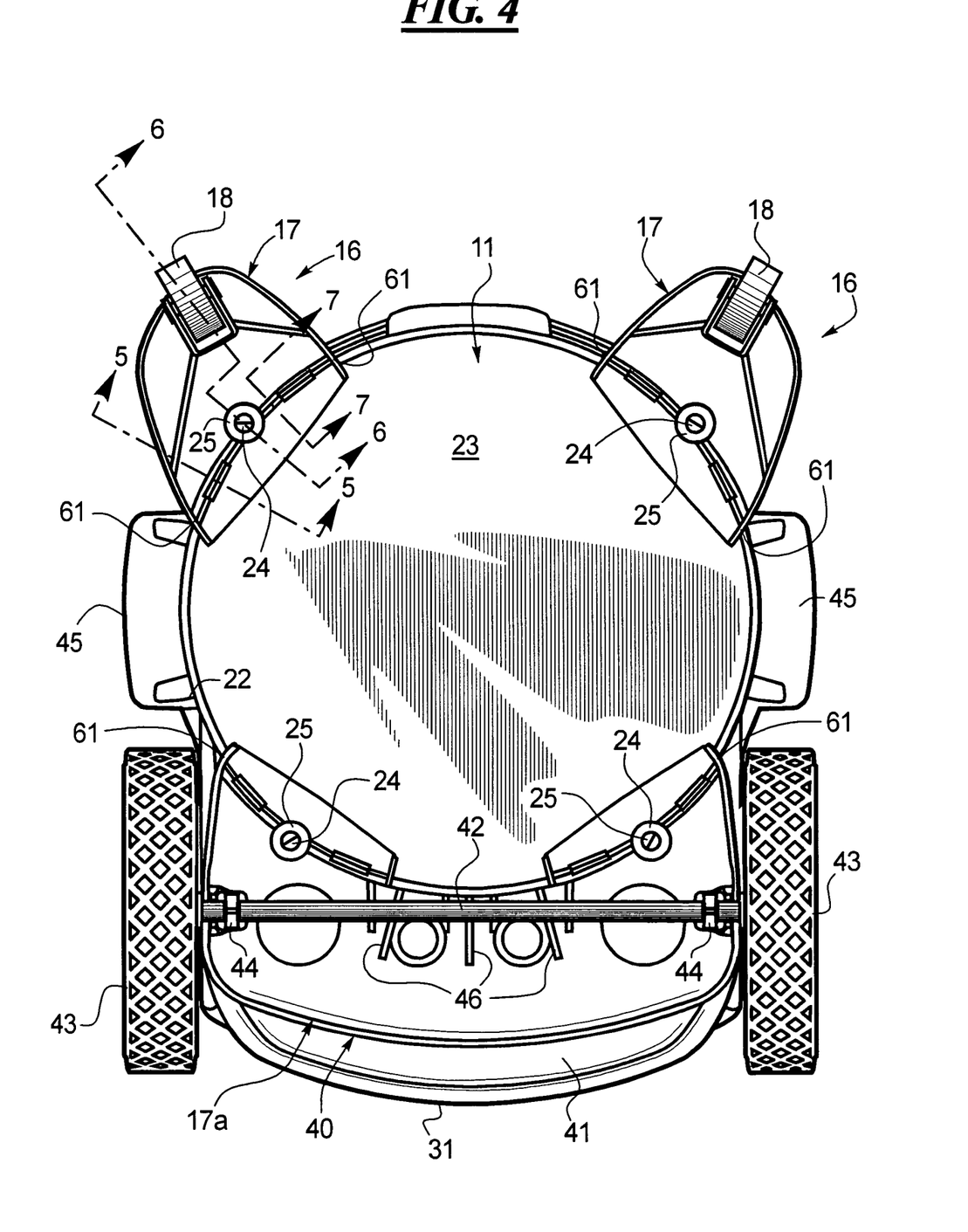
FIG. 4 is a bottom plan of the vacuum cleaner shown in FIG. 3.

Turning to FIG. 4, the wheel dolly assembly 40 includes an outer housing 17a which is connected to in support an axel 42 that is disposed between and connected to a pair of wheels, each of which is shown at 43. The wheel dolly housing 17a is also secured to the lower bead 22 by a snap-fit connection explained in greater detail below in connection with FIGS. 5A–7C and with a threaded fastener 24 that includes a separate or integral washer element shown at 25. The axel 42 is secured to the housing 17a by way of its passing through a pair of rings or loops shown at 44 that are preferably part of the molded structure of the housing 17a. Handles 45 for facilitating the movement and emptying of the tank 11 are also shown in FIGS. 3–4.

FIG. 4 also illustrates the placement of a plurality of radial slots 46 in the wheel-dolly housing 17a. The slots 46 render the housing 17a sufficiently flexible so as to enable it to snap-fit onto cylindrical tanks 11 of varying sizes. For example, the wheel dolly assembly 40 as shown in FIG. 4 is capable of fitting on tanks 11 having diameters from about 14 to about 16 inches. Further, because the caster wheel housings 17 are fabricated from plastic material, these housings 17 can also fit on tanks 11 having varying diameters, such as tanks 11 having diameters ranging from about 14 to about 16 inches. Of course, the dimensions given are mere examples and flexible caster wheel housings 17 and wheeling dolly housings 17a can be fabricated to fit tanks 11 having diameters substantially larger than 16 inches and substantially smaller than 14 inches.

Figures 7A, 7B, 7C:
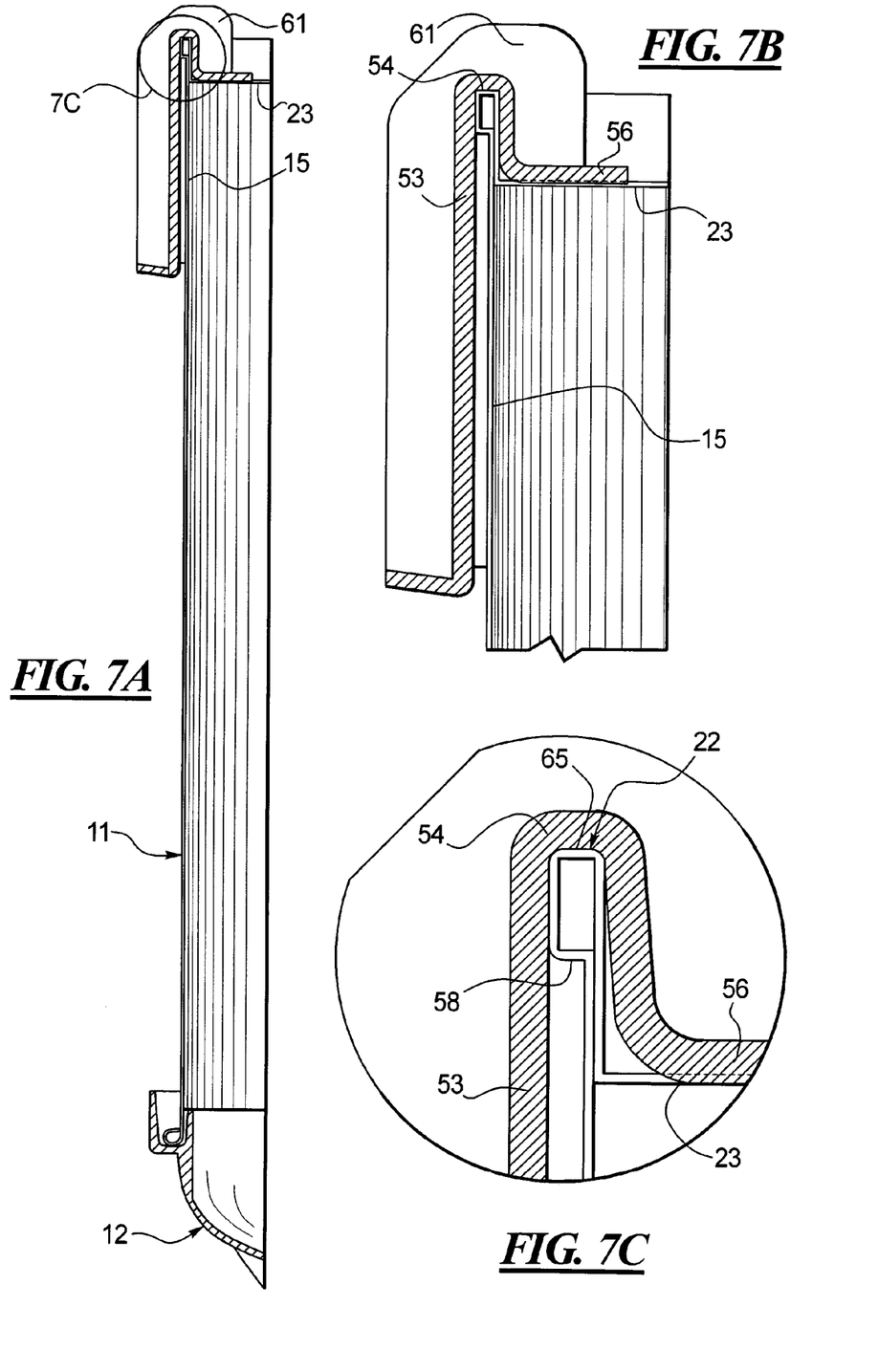
FIG. 7A is a sectional view taken substantially along line 7—7 of FIG. 4.
FIG. 7B is an enlarged sectional view taken substantially line 7—7 of FIG. 4.
FIG. 7C is an enlarged detailed view of the area labeled 7C of FIG. 7A.

Turning to FIGS. 5A–7C the snap-fit connection between the caster assemblies 16 and the wheel dolly assembly 40 to the lower bead 22 of the cylindrical tank 11 are described in greater detail. Referring first to FIGS. 5C, 6C, and 7C, the outer wall 15 of the tank 11 extends downward to the lower bead 22. In the embodiment shown, the tank 11 is fabricated from a sheet metal material and the bead 22 is hollow and is formed by a rectangular fold that extends from the outer wall 15 of the tank 11 to an inner wall shown at 51. The inner wall 51 extends between the lower bead 22 and a bottom panel 23 of the tank 11. While the lower bead 22 as shown in FIGS. 5A–7C is rectangular in configuration, and further is hollow, it will be noted that a solid bead structure 22 could be employed and shapes other than a rectangular shape shown in FIGS. 5A–7C could be employed.

Returning to FIGS. 5A–5C, the outer housing 17 of the caster assembly 16 is connected to a downwardly extending outer wall 53 that extends substantially parallel to the outer wall 15 of the tank 11 as shown. The outer wall 53 of the caster housing 17 terminates or is connected to a u-shaped lower edge shown at 54. The u-shaped lower edge 54 is disposed between and connected to the outer wall 53 and an inner wall 55. In the preferred embodiment shown in FIGS. 5A–7C, the inner wall 55 extends upward in a substantially parallel manner to and in a budding engagement with the inner wall 51 of the tank 11. The inner wall 55 of the caster housing 17 also, in the preferred embodiment shown, terminates at a radially inwardly extending lip 56 that is parallel to and in a budding engagement with the bottom panel 23 of the cylindrical tank 11. Further, the outer wall 53 of the caster housing 17 is also preferably connected to a radially inwardly extending ledge 57. The radially inwardly extending ledge 57, the u-shaped lower edge 54 and the upwardly extending inner wall 55 of the caster housing 17 forms a female receiving area for receiving the lower bead 22 of the tank 11. When the lower bead 22 is firmly inserted into the female receiving area defined by the ledge 57, the u-shaped lower edge 54 and the inner wall 55 of the caster housing 17, the ledge 57 snaps over the top wall 58 (see also FIG. 7C) of the bead to provide a snap-fit connection. Also shown in FIGS. 5A–7C are the outer edges shown at 61 of the caster housings 17 and wheel dolly housing 40 which extend over the bead 22 and provide a reinforcing rib to the snap-fit connection.

Figure 5A:
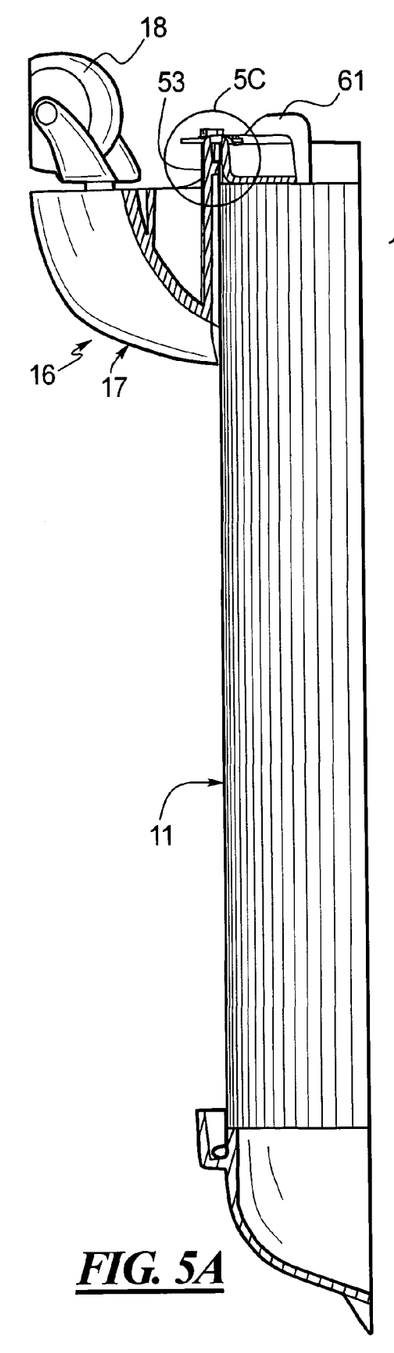
FIG. 5A is a sectional view taken substantially along line 5—5 of FIG. 4.
Figure 5B:
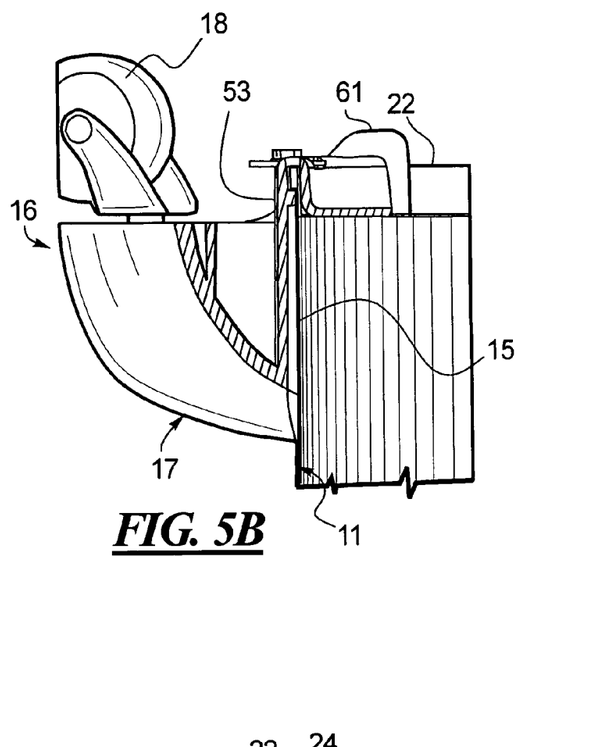
FIG. 5B is a partial sectional view taken substantially along line 5—5 of FIG. 4.
Figure 5C:
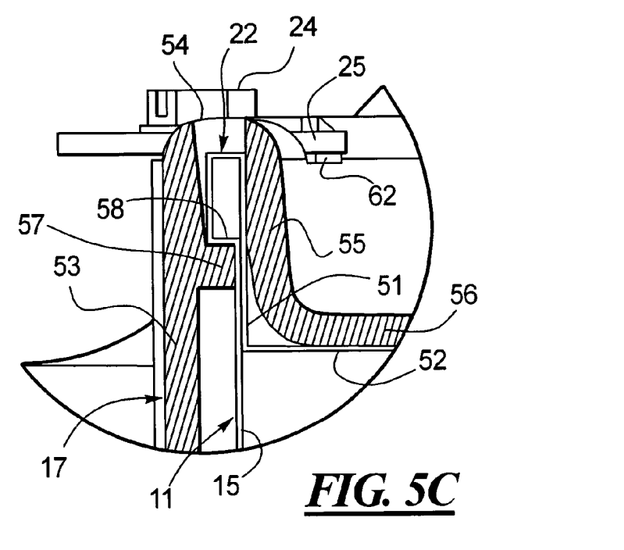
FIG. 5C is an enlarged detailed view of the area labeled 5C of FIG. 5A.

Turning to FIG. 5C it will also be noted that the caster housing 17 includes an opening 62 for receiving the washer 25 or flanged extension of the fastener 24.

Turning to FIG. 6C the outer wall 53 forms a threaded aperture 63 for receiving the fastener 24. A cylindrical wall 64 also defines the threaded aperture with the outer wall 53. The fastener 24 may be accompanied by a separate washer 25 or the washer 25 may be an integral flange attached to the fastener 24. As the fastener 24 is tightened within the aperture 63, the flange or washer 25, which extends through the opening 62 in the u-shaped lower edge 22 and engages the bottom surface 65 of the lower bead. While the threaded engagement between the fastener 24 and the threaded aperture 63 of the caster housing 17 results in a downward clamping action of the ledge 57 against the top surface 58 of the lower bead 22. Thus, tightening the fastener 24 further clamps the lower bead 22 in place and also prevents any peripheral movement of the caster assembly 16 or dolly wheel assembly 40 peripherally about the lower bead 22 of the cylindrical tank 11.

Thus, an improved snap-fit system for attaching caster wheels and dolly type wheels to a cylindrical tank is provided. While a disclosed embodiment is particularly useful for vacuum cleaners the caster wheel assembly 16 and dolly wheel assemblies 40 disclosed herein are also applicable to other uses, such as garbage cans or cylindrical containers or drums containing heavy materials that must be frequently moved.

Finally, the bottom panel 23 or lower bead 22 of the tank 11 may be marked with indicia, indentations or the like to provide the consumer with a guide as to where to mount the caster assembly 16 and/or dolly wheel assembly 40 to the bottom of the tank 11. Any suitable marking or indicia technique may be employed. One such technique would be to provide a single marking on the bead 22 over which the opening 62 in the lower u-shaped 54 is to be disposed. Such a marking would be visible prior to securing the assembly 16 or 40 to the tank 11 with the fastener 24 and washer 25. Also, a pair of markings for each assembly 16 or 40 could be provided between which the outer edges or ribs 61 of the housing 17 or 41 are aligned.

Figure 8:
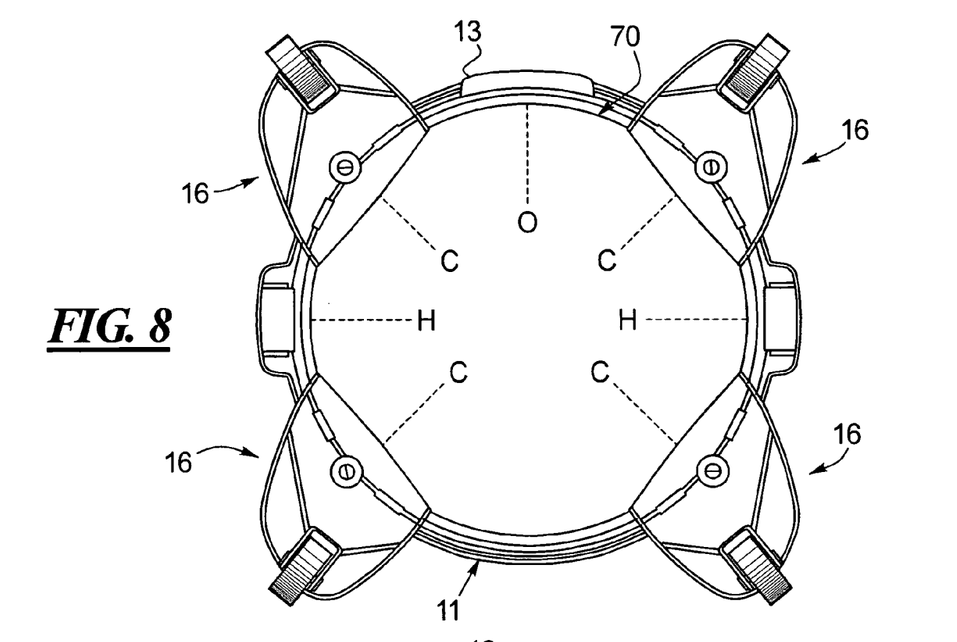
FIG. 8 is a bottom plan view of the vacuum cleaner shown in FIGS. 1 and 2 and further including the placement of a template on the bottom panel of the tank for assisting the consumer in attaching the caster wheel assemblies at the appropriate places on the tank.
Figure 9:
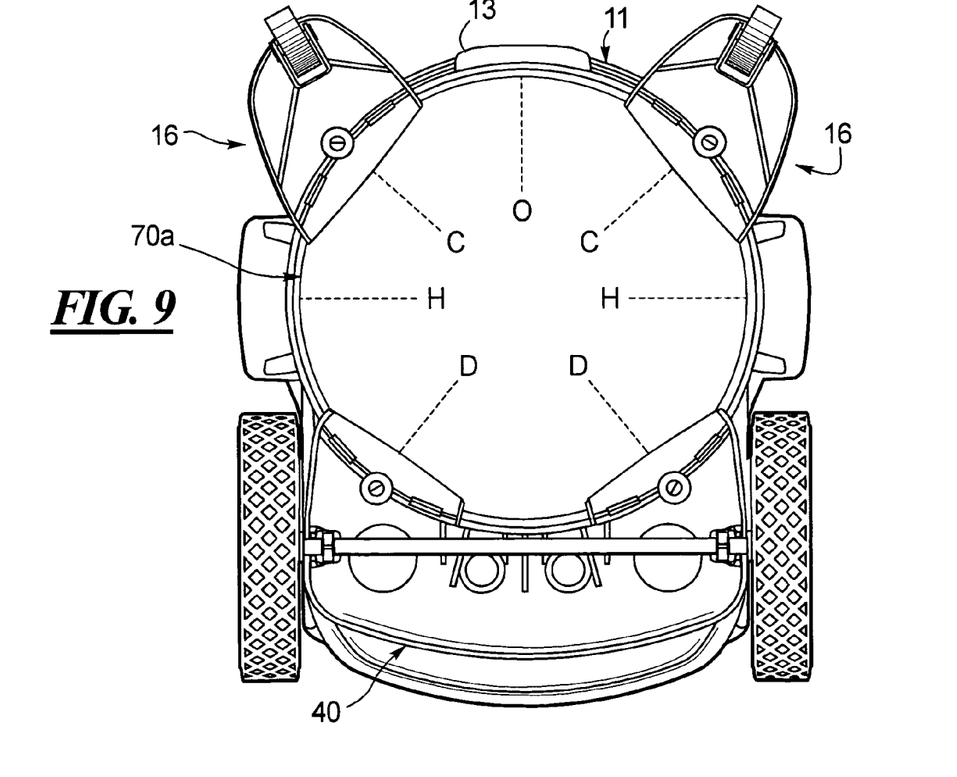
FIG. 9 is a bottom plan view of the vacuum cleaner shown in FIGS. 3 and 4 also showing the use of a removable template similar to that shown in FIG. 8.

FIGS. 8 and 9 are bottom plan views similar to the bottom plan views shown in FIGS. 2 and 4 respectively. However, the bottom panel 23 (see FIGS. 2 and 4) of the tank 11 has been covered with a removable template 70 or 70a as shown. The templates 70, 70a may be a simple sheet of paper, a piece of cardboard or other suitable inexpensive material. The templates 70, 70a are marked with indicia labeled with C, H or O as shown in FIGS. 8 and 9. The indicia line labeled O indicates to the consumer to place the template so that the O-line is in alignment with the suction port 13 for the vacuum hose. The indicia lines marked C of the template 70, 70a shown in FIGS. 8 and 9 respectively provide an easy-position indication for the placement of the caster assemblies 16, of which four are used in FIG. 8 and of which two are used in FIG. 9. The indicia labeled D provides an easy alignment guide for the placement of the wheel dolly assembly 40. Of course, different templates 70, 70a with different markings and different symbols could be utilized, depending upon the number of caster assemblies 16 utilized and whether a wheel dolly assembly 40 is utilized. Additional lines could be provided on the same template 70 shown in FIG. 8 for a three caster wheel assembly 16 configuration. Further, additional lines could be provided for a five caster assembly 16 configuration. Again, various modifications will be apparent to those skilled in the art. One advantage to the templates 70, 70a shown at FIGS. 8 and 9 is that they provide versatility and do not require the manufacturer or mark or place indentations on the tank 11.

While only certain embodiments have been set forth, alternative embodiments and various modifications will be apparent from the above-description to those skilled in the art. These and other alternatives are considered equivalents and within the spirit and scope of this disclosure.

What is claimed is:

1. A combination of a caster assembly, and a tank and a wheel dolly assembly, wherein the caster assembly snap fits onto the tank, the combination comprising:

at least one caster assembly comprising a housing comprising an outer shell connected to at least one caster wheel, the outer shell also being connected to an outer wall, the outer wall extending downward from the outer shell before terminating at a u-shaped lower edge connected to and disposed between the outer wall and an upwardly extending inner wall, the outer wall being connected to an inwardly extending ledge disposed above the u-shaped lower edge and which extends towards the inner wall, the outer wall, u-shaped lower edge, inner wall and ledge of the caster housing defining a female receiving area, a tank comprising an outer wall that extends downwardly and terminates at a radially outwardly extending lower bead, the lower bead being disposed between and connected to the outer wall of the tank and an upwardly extending inner wall of the tank, the lower bead of the tank snap fitting into the female receiving area of the caster housing, an upper portion of the outer shell of the caster assembly being in contact with the outer wall of the tank in a manner so that the caster assembly provides support to the tank the tank being connected to a wheel dolly assembly comprising comprising a housing comprising an outer shell connected to an axel disposed between and connected to a pair of wheel, the outer shell of the wheel dolly housing also being connected to a first outer wall, the first outer wall of the wheel dolly housing extending downward from the outer shell of the wheel dolly housing before terminating at a first u-shaped lower edge connected to and disposed between the first outer wall of the wheel dolly housing and a first upwardly extending inner wall, the first outer wall of the wheel dolly housing being connected to a first inwardly extending ledge disposed above the first u-shaped lower edge of the wheel dolly housing and which extends towards the first inner wall of the wheel dolly housing, the first outer wall, first u-shaped lower edge, first inner wall and first ledge of the wheel dolly housing defining a first female receiving area of the wheel dolly housing, and the bead of the tank snap fitting into the first female receiving area of the wheel dolly housing.

2. The combination of claim 1 wherein the inner wall of the caster housing terminates at a radially inwardly extending lip and the inner wall of the tank is connected to a radially inwardly extending bottom panel, the bottom panel of the tank being disposed on top of the lip of the caster housing when the bead of the tank is snap fitted into the female receiving area of the caster housing.

3. The combination of claim 1 wherein the caster housing is fabricated from molded plastic.

4. The combination of claim 1 wherein the bead of the tank is hollow.

5. The combination of claim 1 wherein the tank is fabricated from sheet metal.

6. The combination of claim 1, wherein the outer wall of the caster housing forming part of a threaded aperture disposed on a side of the outer wall of the caster housing radially opposite from the female receiving area, the u-shaped lower edge of the caster housing comprising an opening aligned with the threaded aperture; the caster assembly further comprising a fastener received in the threaded aperture, the fastener comprising a flange received in the opening of the u-shaped lower edge and which engages a lower surface of the bead of the tank when the fastener is tightened within the threaded aperture.

7. The combination of claim 1 wherein the tank is fabricated from sheet metal and the bead is hollow and has a cross-section that is rectangular in shape.

8. The combination of claim 1 wherein the tank is cylindrical and the outer wall of the tank is convex and the outer wall of the caster housing is concave.

9. The combination of claim 1 wherein the tank is connected to at least three caster assemblies.

10. The combination of claim 1 wherein the outer shell of the wheel dolly housing further comprises a second outer wall, second u-shaped lower edge, second inner wall and second ledge configured like said first outer wall, first u-shaped lower edge, first inner wall and first ledge but spaced apart therefrom to define a second female receiving area for receiving the bead of the tank that is spaced apart from the first female receiving area.

11. The combination of claim 1 wherein the tank is cylindrical and the tank is marked to indicate a preferred attachment place for the at least one caster assembly to bead of the tank.

12. The combination of claim 1 wherein the inner roll of the tank is connected to a radially inwardly extending bottom panel, the combination further comprises a template adapted to lie on top of the bottom panel when the tank is placed in an inverted position, the template comprising a plurality of indicia for indicating a correct spacing of a plurality of caster wheel assemblies about the bead of the tank.

13. The combination of claim 1 wherein the inner roll of the tank is connected to a radially inwardly extending bottom panel, and the combination further comprises a template adapted to lie on top of the bottom panel when the tank is inverted, the template comprising a plurality of indicia for indicating a proper spacing of one or more caster wheel assemblies and a wheel dolly assembly about the bead of the tank.

14. A caster assembly snap-fitting onto a tank connected to a wheel dolly assembly, the caster assembly comprising:
a housing comprising an outer shell connected to at least one caster wheel, the outer shell also being connected to an outer wall, the outer wall extending downward from the outer shell before terminating at a u-shaped lower edge connected to and disposed between the outer wall and an upwardly extending inner wall, the outer wall being connected to an inwardly extending ledge disposed above the u-shaped lower edge and which extends towards the inner wall, the outer wall, u-shaped lower edge, inner wall and ledge of the caster housing defining a female receiving area,
wherein the outer wall of the caster housing forms part of a threaded aperture disposed on a side of the outer wall of the caster housing radially opposite from the female receiving area, the u-shaped lower edge of the caster housing comprising an opening aligned with the threaded aperture, the caster assembly further comprising a fastener received in the threaded aperture, the fastener comprising a flange received in the opening of the u-shaped lower edge, and
wherein the wheel dolly assembly comprises a housing comprising an outer shell connected to an axel disposed between and connected to a pair of wheel, the outer shell of the wheel dolly housing also being connected to a first outer wall, the first outer wall of the wheel dolly housing extending downward from the outer shell of the wheel dolly housing before terminating at a first u-shaped lower edge connected to and disposed between the first outer wall of the wheel dolly housing and a first upwardly extending inner wall, the first outer wall of the wheel dolly housing being connected to a first inwardly extending ledge disposed above the first u-shaped lower edge of the wheel dolly housing and which extends towards the first inner wall of the wheel dolly housing, the first outer wall, first u-shaped lower edge, first inner wall and first ledge of the wheel dolly housing defining a first female receiving area of the wheel dolly housing, a bead of the tank snap fitting into the first female receiving area of the wheel dolly housing.

15. The caster assembly of claim 14 wherein the caster housing is fabricated from molded plastic.

16. The caster assembly of claim 14 wherein the outer wall of the caster housing is concave for abuttingly engaging a convex cylindrical wall of a tank.

17. A vacuum cleaner comprising:
a cylindrical tank comprising an outer wall that extends downwardly and terminates at a radially outwardly extending lower bead, the lower bead being disposed between and connected to the outer wall of the tank and an upwardly extending inner wall of the tank,
a plurality of caster assemblies, each caster assembly comprising a housing comprising an outer shell connected to at least one caster wheel, the outer shell also being connected to an outer wall, the outer wall of the caster housing extending downward from the outer shell before terminating at a u-shaped lower edge connected to and disposed between the outer wall of the caster housing and an upwardly extending inner wall, the outer wall of the caster housing being connected to an inwardly extending ledge disposed above the u-shaped lower edge and which extends towards the inner wall of the caster housing, the outer wall, u-shaped lower edge, inner wall and ledge of the caster housing defining a female receiving area,
the lower bead of the tank snap fitting into the female receiving area of each caster housing with the caster assemblies spaced apart around the lower bead of the tank,
an upper portion of the outer shell of the caster assembly being in contact with the outer wall of the tank in a manner so that the caster assembly provides support to the tank,
wherein the tank is connected to two spaced apart caster assemblies and the tank is also connected a wheel dolly assembly that comprises a wheel dolly assembly comprising a housing comprising an outer shell connected to an axel disposed between and connected to a pair of wheel, the outer shell of the wheel dolly housing also being connected to a first outer wall, the first outer wall of the wheel dolly housing extending downward from the outer shell of the wheel dolly housing before terminating at a first u-shaped lower edge connected to and disposed between the first outer wall of the wheel dolly housing and a first upwardly extending inner wall, the first outer wall of the wheel dolly housing being connected to a first inwardly extending ledge disposed above the first u-shaped lower edge of the wheel dolly housing and which extends towards the first inner wall of the wheel dolly housing, the first outer wall, first u-shaped lower edge, first inner wall and first ledge of the wheel dolly housing defining a first female receiving area of the wheel dolly housing, and
the bead of the tank snap fitting into the first female receiving area of the wheel dolly housing.

18. The vacuum cleaner of claim 17 wherein the inner wall of each caster housing terminates at a radially inwardly extending lip and the inner wall of the tank is connected to a radially inwardly bottom panel, the bottom panel of the tank being disposed on top of the lip of each caster housing when the bead of the tank is snap fitted into the female receiving area of each caster housing.

19. The vacuum cleaner claim 17 wherein each caster housing is fabricated from molded plastic.

20. The vacuum cleaner of claim 17 wherein the bead of the tank is hollow.

21. The vacuum cleaner of claim 17 wherein the tank is fabricated from sheet metal.

22. The vacuum cleaner of claim 19, wherein the outer wall of each caster housing forming part of a threaded aperture disposed on a side of the outer wall of the caster housing radially opposite from the female receiving area, the u-shaped lower edge of the caster housing comprising an opening aligned with the threaded aperture, the caster assembly further comprising a fastener received in the threaded aperture, the fastener comprising a flange received in the opening of the u-shaped lower edge and which engages a lower surface of the bead of the tank when the fastener is tightened within the threaded aperture.

23. The vacuum cleaner of claim 17 wherein the tank is fabricated from sheet metal and the bead is hollow and has a cross-section that is rectangular in shape.

24. The vacuum cleaner of claim 17 wherein the tank is cylindrical and the outer wall of the tank is convex and the outer wall of each caster housing is concave.

25. The vacuum cleaner of claim 17 wherein the outer shell of the wheel dolly housing further comprises a second outer wall, second u-shaped lower edge, second inner wall and second ledge configured like said first outer wall, first u-shaped lower edge, first inner wall and first ledge but spaced apart therefrom to define a second female receiving area for receiving the bead of the tank that is spaced apart from the first female receiving area.

26. The vacuum cleaner of claim 17 wherein the tank is marked to indicate preferred locations for attaching the plurality of caster assemblies to bead of the tank.

27. A combination of a caster assembly, and a tank, and a wheel dolly assembly, wherein the caster assembly snap fits onto the tank, the combination comprising:
  at least one caster assembly comprising a housing comprising an outer shell connected to at least one caster wheel, the outer shell also being connected to an outer wall, the outer wall extending downward from the outer shell before terminating at a u-shaped lower edge connected to and disposed between the outer wall and an upwardly extending inner wall, the outer wall being connected to an inwardly extending ledge disposed above the u-shaped lower edge and which extends towards the inner wall, the outer wall, u-shaped lower edge, inner wall and ledge of the caster housing defining a female receiving area,
  a tank comprising an outer wall that extends downwardly and terminates at a radially outwardly extending lower bead, the lower bead being disposed between and connected to the outer wall of the tank and an upwardly extending inner wall of the tank, the bead of the tank snap fitting into the female receiving area of the caster housing,
  wherein the tank is also connected to a wheel dolly assembly that comprises a housing comprising an outer shell connected to an axel disposed between and connected to a pair of wheel, the outer shell of the wheel dolly housing also being connected to a first outer wall, the first outer wall of the wheel dolly housing extending downward from the outer shell of the wheel dolly housing before terminating at a first u-shaped lower edge connected to and disposed between the first outer wall of the wheel dolly housing and a first upwardly extending inner wall, the first outer wall of the wheel dolly housing being connected to a first inwardly extending ledge disposed above the first u-shaped lower edge of the wheel dolly housing and which extends towards the first inner wall of the wheel dolly housing, the first outer wall, first u-shaped lower edge, first inner wall and first ledge of the wheel dolly housing defining a first female receiving area of the wheel dolly housing.

28. The combination of claim 27 wherein the outer shell of the wheel dolly housing further comprises a second outer wall, second u-shaped lower edge, second inner wall and second ledge configured like said first outer wall, first u-shaped lower edge, first inner wall and first ledge but spaced apart therefrom to define a second female receiving area for receiving the bead of the tank that is spaced apart from the first female receiving area.

29. The combination of claim 27 wherein the inner roll of the tank is connected to a radially inwardly extending bottom panel, and the combination further comprises a template adapted to lie on top of the bottom panel when the tank is inverted, the template comprising a plurality of indicia for indicating a proper spacing of one or more caster wheel assemblies and a wheel dolly assembly about the bead of the tank.

30. A vacuum cleaner comprising:.
  a cylindrical tank comprising an outer wall that extends downwardly and terminates at a radially outwardly extending lower bead, the lower bead being disposed between and connected to the outer wall of the tank and an upwardly extending inner wall of the tank,
  a plurality of caster assemblies, each caster assembly comprising a housing comprising an outer shell connected to at least one caster wheel, the outer shell also being connected to an outer wall, the outer wall of the caster housing extending downward from the outer shell before terminating at a u-shaped lower edge connected to and disposed between the outer wall of the caster housing and an upwardly extending inner wall, the outer wall of the caster housing being connected to an inwardly extending ledge disposed above the u-shaped lower edge and which extends towards the inner wall of the caster housing, the outer wall, u-shaped lower edge, inner wall and ledge of the caster housing defining a female receiving area,
  the bead of the tank snap fitting into the female receiving area of each caster housing with the caster assemblies spaced apart around the lower bead of the tank,
  wherein the tank is connected to two spaced apart caster assemblies and the tank is also connected a wheel dolly assembly that comprises:
  a wheel dolly assembly comprising a housing comprising an outer shell connected to an axel disposed between and connected to a pair of wheel, the outer shell of the wheel dolly housing also being connected to a first outer wall, the first outer wall of the wheel dolly housing extending downward from the outer shell of the wheel dolly housing before terminating at a first u-shaped lower edge connected to and disposed between the first outer wall of the wheel dolly housing and a first upwardly extending inner wall, the first outer wall of the wheel dolly housing being connected to a first inwardly extending ledge disposed above the first u-shaped lower edge of the wheel dolly housing and which extends towards the first inner wall of the wheel dolly housing, the first outer wall, first u-shaped lower edge, first inner wall and first ledge of the wheel dolly housing defining a first female receiving area of the wheel dolly housing, the bead of the tank snap fitting into the first female receiving area of the wheel dolly housing.

31. The vacuum cleaner of claim 30 wherein the outer shell of the wheel dolly housing further comprises a second outer wall, second u-shaped lower edge, second inner wall and second ledge configured like said first outer wall, first u-shaped lower edge, first inner wall and first ledge but spaced apart therefrom to define a second female receiving area for receiving the bead of the tank that is spaced apart from the first female receiving area.

* * * * *

UNITED STATES PATENT AND TRADEMARK OFFICE
CERTIFICATE OF CORRECTION

PATENT NO. : 7,165,290 B2  Page 1 of 1
APPLICATION NO. : 10/677782
DATED : January 23, 2007
INVENTOR(S) : David Martinez et al.

It is certified that error appears in the above-identified patent and that said Letters Patent is hereby corrected as shown below:

In the Claims:

At Column 7, line 56, "and a tank" should be -- a tank --.

At Column 11, line 35, "and a tank" should be -- a tank --.

Signed and Sealed this

Fourth Day of September, 2007

JON W. DUDAS
*Director of the United States Patent and Trademark Office*